(12) United States Patent
Li et al.

(10) Patent No.: US 11,041,819 B1
(45) Date of Patent: Jun. 22, 2021

(54) VISUAL TEST SYSTEM AND METHOD FOR SECONDARY GENERATION OR DECOMPOSITION PROCESS OF HYDRATE

(71) Applicant: INSTITUTE OF GEOLOGY AND GEOPHYSICS, CHINESE ACADEMY OF SCIENCES, Beijing (CN)

(72) Inventors: Xiao Li, Beijing (CN); Bo Zheng, Beijing (CN); Shouding Li, Beijing (CN); Jianming He, Beijing (CN); Zhaobin Zhang, Beijing (CN); Tianqiao Mao, Beijing (CN); Guanfang Li, Beijing (CN); Yanfang Wu, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/189,268

(22) Filed: Mar. 2, 2021

(30) Foreign Application Priority Data

Jul. 21, 2020 (CN) .......................... 202010705426.2

(51) Int. Cl.
*G01N 23/00* (2006.01)
*G01N 23/046* (2018.01)
*G05D 23/19* (2006.01)

(52) U.S. Cl.
CPC .......... *G01N 23/046* (2013.01); *G05D 23/19* (2013.01); *G01N 2223/419* (2013.01)

(58) Field of Classification Search
CPC ....................... G01N 23/046; G01N 2223/419
See application file for complete search history.

(56) References Cited

U.S. PATENT DOCUMENTS

2010/0225913 A1   9/2010   Trainer
2013/0313437 A1*  11/2013  Li .......................... G01T 1/249
                                                          250/363.03
2019/0168211 A1   6/2019   Oldham et al.

FOREIGN PATENT DOCUMENTS

CN        102388148 A        3/2012
CN        102636503 A        8/2012
(Continued)

OTHER PUBLICATIONS

Melanie Holland, et al., Observed Gas Hydrate Morphologies in Marine Sediments, Proceedings of the 6th International Conference on Gas Hydrates, 2008.
(Continued)

*Primary Examiner* — Dani Fox
(74) *Attorney, Agent, or Firm* — Bayramoglu Law Offices LLC

(57) ABSTRACT

A visual test system for a secondary generation or decomposition of a hydrate includes a hydrate conveying device, a computerized tomography (CT) imaging device, a temperature control device, a pressure control device and a flow control device. The hydrate conveying device includes an annular pipeline structure composed of a plurality of straight pipeline sections and a plurality of curved pipeline sections. The straight pipeline section is able to rotate around an axis thereof under the drive of a pipeline driving device. The CT imaging device is used to perform a three-dimensional (3D) detection inside the pipeline, and includes a turntable, a ray source and a detector. The ray source is able to rotate under the drive of the turntable driving device. The temperature control device, the pressure control device and the flow control device are used to control a gas-liquid mixture's temperature, pressure and flow rate, respectively.

18 Claims, 2 Drawing Sheets

(56) References Cited

FOREIGN PATENT DOCUMENTS

| | | |
|---|---|---|
| CN | 105424734 A | 3/2016 |
| CN | 105606634 A | 5/2016 |
| CN | 108226162 A | 6/2018 |
| CN | 108226397 A | 6/2018 |
| CN | 209215179 U | 8/2019 |
| CN | 110389126 A | 10/2019 |
| CN | 110926985 A | 3/2020 |
| EP | 2825865 A1 | 1/2015 |
| EP | 3154436 A2 | 4/2017 |
| WO | 2007021557 A2 | 2/2007 |

OTHER PUBLICATIONS

Sha Zhibin, et al., Technology of 3-D Volume Visualization by Application and Study of the Gas Hydrates, 2009, pp. 59-67.

\* cited by examiner

VISUAL TEST SYSTEM AND METHOD FOR SECONDARY GENERATION OR DECOMPOSITION PROCESS OF HYDRATE

CROSS REFERENCE TO THE RELATED APPLICATIONS

This application is based upon and claims priority to Chinese Patent Application No. 202010705426.2, filed on Jul. 21, 2020, the entire contents of which are incorporated herein by reference.

TECHNICAL FIELD

The present invention belongs to the technical field of hydrate exploitation, and specifically relates to a visual test system and method for a secondary generation or decomposition process of a hydrate.

BACKGROUND

As a future alternative energy source, natural gas hydrate (NGH) has substantial research value. Also known as hydrate, NGH is a semi-stable solid compound formed by certain components in natural gas and moisture under appropriate temperatures and pressures, having an appearance similar to dense wet snow. Additionally, hydrate is a clathrate, in which water molecules (host molecules) are bonded by hydrogen bonds to form cage crystals, and gas molecules (guest molecules) are surrounded by the crystal lattice under van der Waals force. During the transportation process of natural gas, hydrate is easily generated due to geomorphology, climate and the conditions of the pipeline itself, and it will block the pipeline, and even cause equipment separation and instrument failure.

In the NGH exploitation process, methane inevitably lingers in the water production pipeline due to the limitations brought by the existing gas-liquid separation technology. As the hydrate exploitation constantly continues, the residual methane and seawater in the water production pipeline may be combined to regenerate hydrate. When the regenerated hydrate increases to a certain amount, the pipeline will be blocked, causing the bottom hole pressure of the mining well to decrease and fail, and forcing the hydrate exploitation to stop. Especially for dead zones at right angles in the water production pipeline, the risk of blockage is greater. Under the conditions of different temperatures, pressures, flow rates and wall thicknesses, the secondary generation of the hydrate in the flowing state is completely different from that in the static state. At present, most research on the generation and decomposition characteristics of hydrate are carried out in large-volume reactors, most of which are non-visualized, that is, blind test. In the later stage, in order to further explore the generation and decomposition characteristics of hydrate, a visual window is added to the reactor, but it does not fully achieve real-time observation and monitoring. With the further development of science and technology, nuclear magnetic imaging (NMI), Raman spectroscopy, etc. have been introduced and used in this research area, but they are still unable to realize visualized three-dimensional (3D) detection of the dynamic generation and evolution of the hydrate.

SUMMARY

In order to solve the above-mentioned problem in the prior art, that is, to realize visualization of the secondary generation or decomposition process of the hydrate and acquire reliable data of the generation process, the present invention provides a visual test system and method for a secondary generation or decomposition process of a hydrate.

A first aspect of the present invention provides a visual test system for a secondary generation or decomposition process of a hydrate, including a hydrate conveying device, a computerized tomography (CT) imaging device, a temperature control device, a pressure control device and a flow control device. The hydrate conveying device includes a plurality of straight pipeline sections and a plurality of curved pipeline sections; the curved pipeline sections and the straight pipeline sections are connected in sequence to form an annular pipeline structure. The plurality of straight pipeline sections are able to respectively rotate around an axis thereof under the drive of a corresponding pipeline driving device.

The CT imaging device includes a turntable, a ray source and a detector. The turntable is provided inside the annular pipeline structure. The ray source is provided on the turntable and is able to rotate under the drive of a turntable driving device. The detector is provided outside the annular pipeline structure, and is used to cooperate with the ray source to perform a three-dimensional (3D) detection inside a corresponding straight pipeline section.

The temperature control device is used to control the temperature of a gas-liquid mixture in the hydrate conveying device.

The pressure control device is used to control the pressure of the gas-liquid mixture in the hydrate conveying device.

The flow control device includes a flow sensor and a constant flow pump. The flow sensor and the constant flow pump are respectively provided in the annular pipeline structure, and are used to control the flow rate of the gas-liquid mixture in the hydrate conveying device.

In some preferred embodiments, the visual test system includes a plurality of detectors.

The plurality of detectors are respectively provided outside the plurality of straight pipeline sections.

In some preferred embodiments, the visual test system includes a turntable;

The turntable is provided in the center of the annular pipeline structure.

In some preferred embodiments, the visual test system includes a plurality of turntables.

The plurality of turntables are provided corresponding to the plurality of straight pipeline sections.

In some preferred embodiments, an included angle between lines formed by respectively connecting two ends of the detector to the ray source is greater than an included angle between lines formed by respectively connecting two ends of the straight pipeline section to the ray source. The length of the detector is greater than the length of the straight pipeline section.

In some preferred embodiments, an annular sealing device is provided between a straight pipeline section and a curved pipeline section that are adjacent to each other. The annular sealing device includes a slip ring rotating part, a slip ring stationary part and a rotating seal slip ring. The slip ring rotating part is provided at an end of the straight pipeline section; the slip ring stationary part is provided at an end of the curved pipeline section; the rotating seal slip ring is provided between the slip ring rotating part and the slip ring stationary part, and is able to rotate around an axis thereof under the drive of the pipeline driving device to realize the rotation of the corresponding straight pipeline section.

The pipeline driving device is a coaxial rotating motor; and the coaxial rotating motor is provided outside the corresponding straight pipeline section.

In some preferred embodiments, the temperature control device includes a temperature-controlled bath liquid pipe, a thermal insulation layer, a temperature sensor and a temperature controller. The temperature-controlled bath liquid pipe includes a first temperature-controlled bath liquid pipe and a second temperature-controlled bath liquid pipe; the first temperature-controlled bath liquid pipe is provided on a peripheral side of the hydrate conveying device; the second temperature-controlled bath liquid pipe is provided between the first temperature-controlled bath liquid pipe and the temperature controller, and a connecting section of the second temperature-controlled bath liquid pipe and the first temperature-controlled bath liquid pipe is provided in the curved pipeline section. The temperature controller controls the temperature of a bath liquid in the hydrate conveying device through the first temperature-controlled bath liquid pipe and the second temperature-controlled bath liquid pipe.

In some preferred embodiments, the turntable includes a rotating part and a supporting part; and the rotating part and the supporting part are relatively rotatably connected.

One or more grooves are provided on an upper side of the rotating part.

One or more protrusions are provided on the bottom of the ray source.

The ray source is fixedly mounted on the rotating part through the protrusion and the groove on the rotating part.

In some preferred embodiments, the pressure control device includes a pressurizing device, a storage device, a recovery device and a pressure sensor. The storage device is connected to the pressurizing device through a first pipe. The pressurizing device is connected to the annular pipeline structure through a second pipe. The recovery device is connected to the annular pipeline structure through a third pipe. The pressure sensor is provided in the third pipe to detect a difference between internal pressures of the annular pipeline structure and the recovery device.

The first pipe, the second pipe and the third pipe are respectively provided with a high-pressure valve.

A second aspect of the present invention provides a visual test method for a secondary generation or decomposition process of a hydrate, based on any one of the above-mentioned visual test systems, and including the following steps:

S100: controlling, by the temperature control device, the bath liquid in the annular temperature-controlled bath liquid pipe outside the annular pipeline structure to a preset first temperature;

S200: controlling, by the pressure control device, the storage device to inject the gas-liquid mixture into the annular pipeline structure until the annular pipeline structure is full; controlling, by the pressure control device, the pressurizing device to control the pressure in the annular pipeline structure, and controlling the pressure of the gas-liquid mixture in the annular pipeline structure to reach a preset pressure value according to the detection of the pressure sensor; obtaining an initial 3D shape of the inside of the annular pipeline structure based on the detection of the CT imaging device;

S300: controlling, by the flow control device, the gas-liquid mixture in the pipeline to circulate; controlling, by the temperature control device, the temperature of the circulating gas-liquid mixture to reduce according to a preset temperature gradient so as to reduce the temperature in the annular pipeline structure; obtaining a 3D shape of the inside of the annular pipeline structure under different temperatures based on the detection of the CT imaging device, so as to acquire a dynamic generation process of a solid hydrate in the pipeline; where the detection of the CT imaging device is a comprehensive 3D detection performed on a corresponding straight pipeline section through a rotation control of the corresponding straight pipeline section by the pipeline driving device and cooperation of the turntable with the detector;

S400: repeating S100, S200 and S300 based on the 3D shape of the inside of the annular pipeline structure obtained in S300 until the gas-liquid mixture flowing in the pipeline forms a hydrate attached to a sidewall of the pipeline, and recording a corresponding parameter;

S500: when the hydrate generated in the pipeline blocks the pipeline or a temperature control is completed according to a preset temperature gradient, controlling, by the temperature control device, the temperature of the circulating gas-liquid mixture to increase according to the preset temperature gradient so as to increase the temperature in the annular pipeline structure; obtaining a 3D shape of the inside of the annular pipeline structure under different temperatures based on the detection of the CT imaging device;

S600: controlling, by the flow control device, a flow rate of a gas-liquid mixture generated by decomposition in the pipeline; collecting, by the recovery device in the pressure control device, the gas-liquid mixture generated by the decomposition of the solid hydrate; and S700: repeating S500 and S600 based on the detection of the CT imaging device until the solid hydrate on the inner wall of the pipeline is completely decomposed, and recording a corresponding parameter.

The present invention has the following advantages:

1) according to the visual test system for the secondary generation or decomposition process of the hydrate provided by the present invention, the straight pipeline sections can be accurately rotated to cooperate with the detection of the CT imaging device under different temperatures, pressures and flow rates of the hydrate in the pipeline and different wall thicknesses of the pipeline, thereby realizing a dynamical and quantitative detection of the secondary generation process of the hydrate in the corresponding pipeline. During the gradual generation or decomposition process, the range of hydrate generation and the dynamic and gradual development process of the hydrate can be detected in real time, and the influences of stress and different temperatures, flow rates and pipeline cross-sections on the hydrate generation or decomposition process can be quantitatively studied. In this way, the present invention derives the law of corresponding parameters and provides reliable test data for the secondary change process of the hydrate in actual hydrate exploitation.

2) The present invention fully considers the complexity of actual engineering parameters by controlling parameters relating to the pipeline cross-section, pipeline space position, gradient temperature rise or fall and the fluidity of the hydrate, which further reveals the change mechanism of the secondary generation or decomposition process of the hydrate. By carrying out test design based on a similarity principle, the present invention provides an effective test basis and research method for summarizing the secondary change characteristics of the hydrate, and provides reliable technical support for hydrate exploitation and pipeline safety protection.

3) Through the annular pipeline structure composed of straight and curved pipeline sections, the present invention realizes a fast dynamic reaction for the secondary generation and/or decomposition test of the hydrate.

4) The visual system of the present invention has a simple and novel structure, low cost and easy promotion.

BRIEF DESCRIPTION OF THE DRAWINGS

Other features, objectives and advantages of the present invention will become more apparent upon reading the detailed description of the non-restrictive embodiments of the present invention made with reference to the accompanying drawings.

Figure 1:
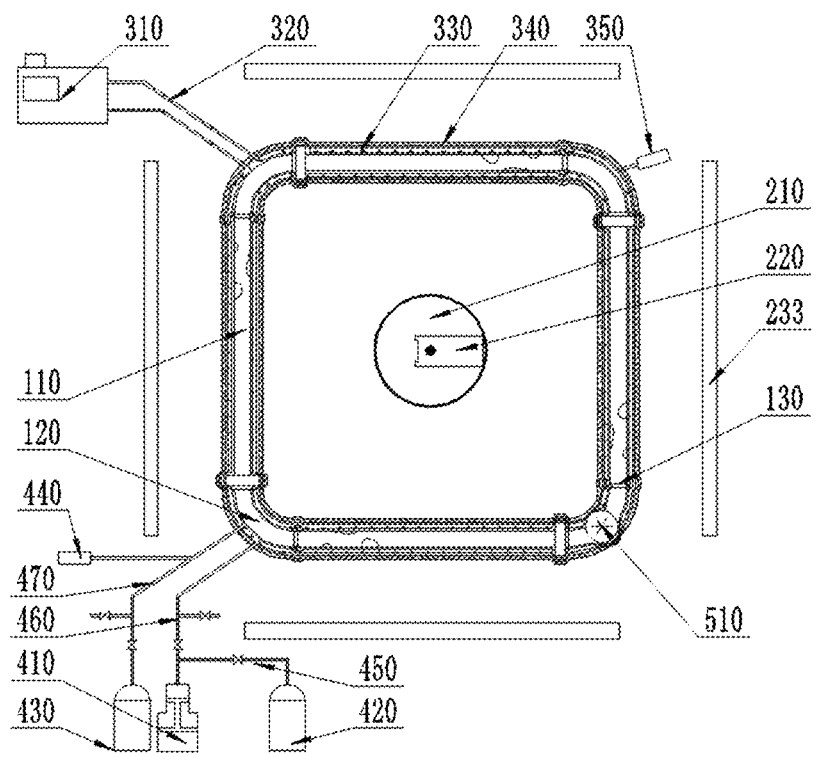
FIG. 1 is a stereoscopic view of a visual test system for a secondary generation or decomposition process of a hydrate according to an embodiment of the present invention.

Reference numerals: 110. straight pipeline section; 111. first straight pipeline section; 112. second straight pipeline section; 113. third straight pipeline section; 114. fourth straight pipeline section; 120. curved pipeline section; 121. first curved pipeline section; 122. second curved pipeline section; 123. third curved pipeline section; 124. fourth curved pipeline section; 130. annular sealing device; 131. slip ring rotating part; 132. slip ring stationary part; 133. rotating seal slip ring; 134. coaxial rotating motor;

210. turntable; 211. first turntable; 212. second turntable; 213. third turntable; 214. fourth turntable;

220. ray source; 221. first ray source; 222. second ray source; 223. third ray source; 224. fourth ray source; 230. detector; 231. first detector; 232. second detector; 233. third detector; 234. fourth detector;

310. temperature controller; 320. second temperature-controlled bath liquid pipe; 330. first temperature-controlled bath liquid pipe; 340. thermal insulation layer; 350. temperature sensor;

410. pressurizing device; 420. storage device; 430. recovery device; 440. pressure sensor; 450. first pipe; 460. second pipe; 470. third pipe; 510. constant flow pump.

DETAILED DESCRIPTION OF THE EMBODIMENTS

The preferred implementations of the present invention are described below with reference to the accompanying drawings. Those skilled in the art should understand that the implementations herein are merely intended to explain the technical principles of the present invention, rather than to limit the protection scope of the present invention.

The present invention provides a visual test system for a secondary generation or decomposition process of a hydrate. The visual test system includes a hydrate conveying device, a computerized tomography (CT) imaging device, a temperature control device, a pressure control device and a flow control device. The hydrate conveying device includes a plurality of straight pipeline sections and a plurality of curved pipeline sections. The curved pipeline sections and the straight pipeline sections are connected in sequence to form an annular pipeline structure, which is used to contain an injected gas-liquid mixture for a secondary generation and/or decomposition simulation test of a hydrate. The plurality of straight pipeline sections are able to respectively rotate around an axis thereof under the drive of a corresponding pipeline driving device. Different from a traditional fixed pipeline detection, in the present invention, the straight pipeline sections are flexibly provided, which further improves the flexibility of the overall system. The present invention uses the CT imaging device to visually detect the secondary generation or decomposition process of the hydrate. The present invention realizes the comprehensive detection of the secondary generation or decomposition process of the hydrate through the rotation of the rotatable straight pipeline sections, and acquires a changing state of an inner wall of a pipeline under different temperatures and pressures, etc. The CT imaging device includes a turntable, a ray source and a detector. The ray source is fixedly provided on the turntable. The turntable is provided inside the annular pipeline structure to carry the ray source, and is able to drive the ray source to rotate under the drive of a turntable driving device, so as to detect changes in the inner wall of the pipeline in the annular pipeline structure in different directions and angles. The detector is provided outside the annular pipeline structure, and is used to cooperate with the ray source to perform a three-dimensional (3D) detection inside a corresponding straight pipeline section. Since the present invention focuses on simulating the detection of the straight pipeline section, the detector is only provided for the straight pipeline section. The temperature control device is used to control the temperature of the gas-liquid mixture in the hydrate conveying device. By controlling the temperature of a bath liquid in a temperature-controlled bath liquid pipe provided on a peripheral side of the hydrate conveying device, the high and low temperature control of the gas-liquid mixture is realized, and the generation or decomposition process of the hydrate is simulated. The pressure control device is used to control the pressure of the gas-liquid mixture in the annular pipeline structure for pressure regulation and maintenance. The flow control device includes a flow sensor and a constant flow pump. The flow sensor and the constant flow pump are respectively provided in the annular pipeline structure, and are used to control a flow rate of the gas-liquid mixture in the annular pipeline structure, so as to more realistically simulate the secondary generation or decomposition process of the hydrate when the gas-liquid mixture flows in the pipeline.

Further, a corresponding detector may be provided outside the curved pipeline section to visually detect the secondary generation or decomposition process of the hydrate on an inner wall of the curved pipeline section. In this way, the present invention realizes the simulation of the hydrate changing in straight and curved sections in an actual hydrate exploitation process.

The present invention is described in more detail below with reference to the accompanying drawings and specific embodiments.

FIG. 1 is a stereoscopic view of a visual test system for a secondary generation or decomposition process of a hydrate according to an embodiment of the present invention. As shown in FIG. 1, the visual test system includes a hydrate conveying device for containing a gas-liquid mixture for reaction, a CT imaging device for performing a 3D detection of a changing state of an inner wall of a pipeline, a temperature control device for controlling the temperature of the gas-liquid mixture in the hydrate conveying device, a pressure control device for controlling the pressure of the gas-liquid mixture in the hydrate conveying device, and a flow control device for controlling the flow rate of the gas-liquid mixture in the hydrate conveying device.

The hydrate conveying device includes a plurality of straight pipeline sections 110 and a plurality of curved pipeline sections 120. The curved pipeline sections 110 and the straight pipeline sections 120 are connected in sequence to form an annular pipeline structure. The plurality of straight pipeline sections are able to respectively rotate around an axis thereof under the drive of a corresponding pipeline driving device, so as to cooperate with the CT imaging device for a comprehensive detection of the corresponding pipeline sections. In this way, the present invention accurately acquires the real-time reaction states of the hydrate on the inner wall of the pipeline under corresponding parameters in corresponding time periods, and further acquires hydrate reaction state parameters that are respectively corresponding to the pressure, temperature, flow rate and test time, as well as 3D images.

Further, the CT imaging device includes the turntable 210, the ray source 220 and the detector 230. The turntable 210 is provided inside the annular pipeline structure. In this embodiment, the turntable 210 is preferably provided at the center of the annular pipeline structure. The ray source 220 is provided on the turntable 210, and is able to realize circumferential rotation under the drive of a turntable driving device, so as to realize the 3D detection of the pipeline of the annular pipeline structure. The detector 230 is provided outside the annular pipeline structure, and is used to cooperate with the ray source to perform a 3D detection inside a corresponding straight pipeline section. In this embodiment, there are four detectors, which are respectively provided outside the corresponding straight pipeline section. In this embodiment, since the curved pipeline sections 120 are only used for a transitional connection of adjacent straight pipeline sections, no detector is correspondingly provided outside the curved pipeline sections.

Further, the temperature control device is used to control the temperature of the gas-liquid mixture in the hydrate conveying device. The temperature control device includes the temperature controller 310, the first temperature-controlled bath liquid pipe 330, the second temperature-controlled bath liquid pipe 320, the thermal insulation layer 340 and the temperature sensor 350. The temperature controller 310 is provided outside the annular pipeline structure and is used to control the operation of the entire temperature control device. The first temperature-controlled bath liquid pipe 330 is provided on a peripheral side of the annular pipeline structure. The second temperature-controlled bath liquid pipe 320 is provided between the first temperature-controlled bath liquid pipe 330 and the temperature controller 310, and a connecting section of the second temperature-controlled bath liquid pipe 320 and the first temperature-controlled bath liquid pipe 330 is provided in the curved pipeline section so as not to affect the rotation of the straight pipeline section. The temperature controller controls the temperature of a bath liquid in the hydrate conveying device through the first temperature-controlled bath liquid pipe and the second temperature-controlled bath liquid pipe.

Further, the second temperature-controlled bath liquid pipe 320 includes a liquid inlet pipe and a liquid outlet pipe. The temperature controller 310 controls the temperature of the circulating bath liquid through the liquid inlet pipe, the annular pipeline structure and the liquid outlet pipe. The temperature of the circulating bath liquid is detected by the temperature sensor 350 provided in the annular pipeline structure. The temperature controller 310 is connected in communication with the temperature sensor 350, and adjusts the temperature of the circulating bath liquid in real time based on the detection of the temperature sensor 350, so as to ensure the controlled temperature of the hydrate in the annular pipeline structure. Further, the thermal insulation layer 340 is provided outside the temperature-controlled bath liquid pipe to keep the temperature of the bath liquid.

Further, the pressure control device is used to control the pressure of the gas-liquid mixture (i.e. hydrate) in the hydrate conveying device. The pressure control device includes the pressurizing device 410, the storage device 420, the recovery device 430 and the pressure sensor 440, which are provided outside the annular pipeline structure so as not to affect the rotation of the straight pipeline section. The storage device 420 is connected to the pressurizing device 410 via the first pipe 450, and is used to inject the gas-liquid mixture. The pressurizing device 410 is connected to the annular pipeline structure through the second pipe 460, and is used to adjust the pressure in the annular pipeline structure through the injected gas-liquid mixture and supplement the gas-liquid mixture during a hydrate reaction process. The recovery device 430 is connected to the annular pipeline structure through the third pipe 470, and is used to recover a gas-liquid mixture generated during a hydrate decomposition reaction. The pressure sensor 440 is provided in the third pipe 470, and is used to detect a difference between internal pressures of the annular pipeline structure and the recovery device, so as to determine a time limit for closing or opening the recovery device.

Further, the first pipe 450, the second pipe 460 and the third pipe 470 are respectively provided with a first high-pressure valve, a second high-pressure valve and a third high-pressure valve for opening or closing the respective pipe. In addition, the second pipe 460 and the third pipe 470 are further provided with a fourth high-pressure valve and a fifth high-pressure valve for discharging a residual gas-liquid mixture in the pipeline at different specific time periods.

Further, the pressurizing device is a pressurizer; the storage device is a storage tank; and the recovery device is a recovery tank.

Further, the flow control device includes a flow sensor and the constant flow pump 510. The flow sensor and the constant flow pump 510 are respectively provided in the annular pipeline structure, and are used to control a flow rate of the gas-liquid mixture in the hydrate conveying device. In this embodiment, the constant flow pump is used to simulate the stable circulating flow of the hydrate in the annular pipeline structure so as to further simulate the flow state of the hydrate in an actual pipeline.

Further, an included angle between lines formed by connecting two ends of the detector to the ray source is greater than an included angle between lines formed by connecting two ends of the straight pipeline section to the ray source. The length of the detector is greater than the length of the straight pipeline section. When the ray source rotates to a set position of the corresponding straight pipeline section, there is no need to fine-tune or rotate the turntable, and the detection of the entire straight pipeline section can be realized through a large radiation area of the ray source. The turntable only needs a rotation control when the ray source detects straight pipeline sections in different orientations.

Further, the turntable includes a rotating part and a supporting part. The rotating part and the supporting part are relatively rotatably connected. One or more grooves are provided on an upper side of the rotating part, and one or more protrusions are provided on the bottom of the ray source. The ray source is fixedly mounted on the rotating part through the protrusion and the groove on the rotating part. The ray source is engaged with and connected to the upper side of the rotating part of the turntable only under the action of gravity, and no additional connecting piece is required for fixing, which is convenient for disassembly.

Further, the annular sealing device 130 is provided between a straight pipeline section and a curved pipeline section that are adjacent to each other, that is, two ends of each straight pipeline section are respectively provided with the annular sealing device. A coaxial rotating motor drives the annular sealing device provided corresponding to the coaxial rotating motor to realize the rotation of the corresponding straight pipeline section. The annular sealing device, the rotating motor and the rotatable straight pipeline section are provided on an inner side of the temperature-controlled bath liquid pipe.

Figure 2:
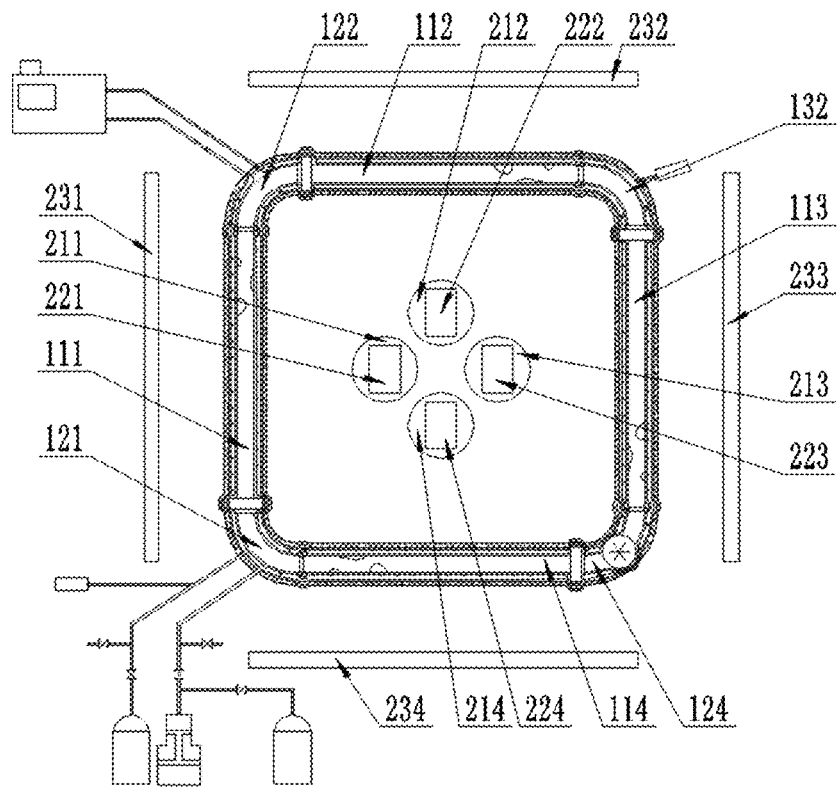
FIG. 2 is a stereoscopic view of a visual test system for a secondary generation or decomposition process of a hydrate according to another embodiment of the present invention.
Figure 3:
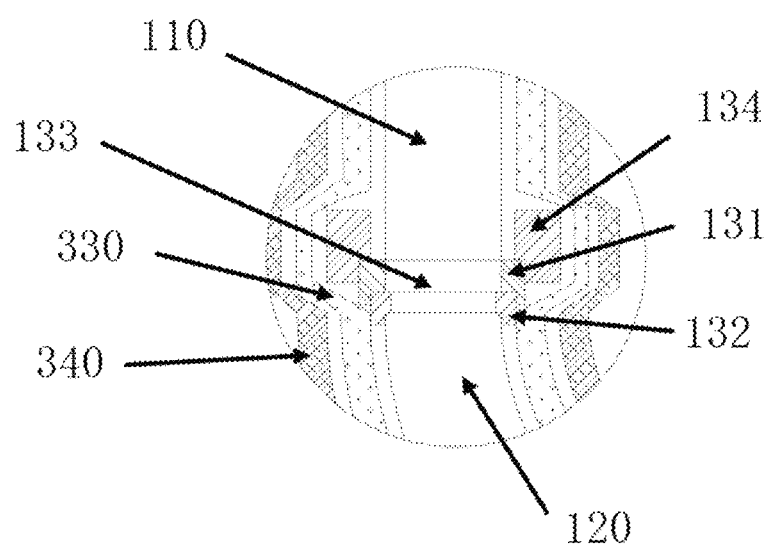
FIG. 3 is a sectional view of an annular sealing device shown in FIG. 1.

FIG. 2 is a stereoscopic view of a visual test system for a secondary generation or decomposition process of a hydrate according to another embodiment of the present invention. The visual test system includes a plurality of turntables. The plurality of turntables, a plurality of ray sources and a plurality of straight pipeline sections are correspondingly arranged. Further, as shown in FIG. 2, the visual test system includes the first straight pipeline section 111, the second straight pipeline section 112, the third straight pipeline section 113, the fourth straight pipeline section 114, the first curved pipeline section 121, the second curved pipeline section 122, the third curved pipeline section 123, the fourth curved pipeline section 124, the first turntable 211, the second turntable 212, the third turntable 213, the fourth turntable 214, the first ray source 221, the second ray source 222, the third ray source 223, the fourth ray source 224, the first detector 231, the second detector 232, the third detector 233 and the fourth detector 234. The first turntable 211, the first ray source 221, the first straight pipeline section 111 and the first detector 231 are correspondingly arranged. The second turntable 212, the second ray source 222, the second straight pipeline section 112 and the second detector 232 are correspondingly arranged. The third turntable 213, the third ray source 223, the third straight pipeline section 113 and the third detector 233 are correspondingly arranged. The fourth turntable 214, the fourth ray source 224, the fourth straight pipeline section 114 and the fourth detector 234 are correspondingly arranged. Through the one-to-one corresponding arrangement of the plurality of ray sources and the plurality of detectors, this embodiment simultaneously performs visual detections of the entire secondary generation or decomposition process of the hydrate in the plurality of straight pipeline sections, and extracts accurate 3D CT digital images of a solid hydrate in different positions. This embodiment further derives the corresponding relationships between the hydrate generation or decomposition rate and state and pipeline cross-section, test time, temperature, pressure and flow rate in each time period, and comprehensively acquires reliable data of hydrate generation or decomposition FIG. 3 is a sectional view of the annular sealing device of FIG. 1, which is the annular sealing device in the lower left corner of FIG. 1. As shown in FIG. 3, the annular sealing device includes the slip ring rotating part 131, the slip ring stationary part 132 and the rotating seal slip ring 133. The slip ring rotating part 131 is provided at an end of the straight pipeline section 110. The slip ring stationary part 132 is provided at an end of the curved pipeline section 120. The rotating seal slip ring 133 is provided between the slip ring rotating part 131 and the slip ring stationary part 132, and is able to rotate around an axis thereof under the drive of the coaxial rotating motor 134 to realize the rotation of the corresponding straight pipeline section. The coaxial rotating motor is provided outside the corresponding straight pipeline section. A temperature-controlled bath liquid device and a thermal insulation device are correspondingly provided outside the annular sealing device to achieve temperature control and heat insulation of this part.

It should be noted that, for the annular sealing device provided in other position in FIG. 1, the slip ring rotating part, the slip ring stationary part and the rotating seal slip ring are correspondingly arranged in the corresponding straight pipeline section and curved pipeline section, so as to realize the rotation of the straight pipeline section at the corresponding position.

A visual test method for a secondary generation or decomposition process of a hydrate, based on the above-described visual test system, includes the following steps.

S100: the temperature of the circulating bath liquid on an outer side of the annular pipeline structure is adjusted through the second temperature-controlled bath liquid pipe and the first temperature-controlled bath liquid pipe by the temperature controller in the temperature control device; the temperature of a hydrate in the annular pipeline structure is controlled to a preset first temperature according to a detection of the temperature sensor; meanwhile, the fifth high-pressure valve in the third pipe is opened to discharge air in the annular pipeline structure. In the present invention, the preset first temperature is 2° C. to 5° C.

S200: the fifth high-pressure valve is closed; the first high-pressure valve in the first pipe and the second high-pressure valve in the second pipe are opened; the storage device in the pressure control device is controlled to inject the gas-liquid mixture into the annular pipeline structure until the annular pipeline structure is full; the first high-pressure valve in the first pipe is closed; the pressurizing device in the pressure control device is used to control the pressure of the gas-liquid mixture in the annular pipeline structure, and the pressure of the gas-liquid mixture in the annular pipeline structure is controlled to reach a preset pressure value according to the detection of the pressure sensor; an initial 3D shape of the inside of the annular pipeline structure is obtained based on the detection of the CT imaging device.

S300: the gas-liquid mixture in the pipeline is controlled to circulate by the constant flow pump in the flow control device; the temperature of the bath liquid in the first temperature-controlled bath liquid pipe and the second temperature-controlled bath liquid pipe is controlled by the temperature controller in the temperature control device, so as to further control the temperature of the circulating gas-liquid mixture to reduce according to a preset temperature gradient, thereby gradually generating a hydrate attached to an inner wall of the pipeline; a 3D shape of the inside of the annular pipeline structure under different temperatures is acquired based on the detection of the CT imaging device, so as to acquire a dynamic generation process of a solid hydrate in the pipeline, where the detection of the CT imaging device is a comprehensive 3D detection performed on a corresponding straight pipeline section through a rotation control of the corresponding straight pipeline section by the pipeline driving device and cooperation of the turntable with the detector.

Due to the continuous generation of the solid hydrate, the gas-liquid mixture in the annular pipeline structure is continuously consumed. The gas-liquid mixture may be supplemented into the pipeline through the pressurizing device as follows: first closing the second high-pressure valve to keep the pressure in the pipeline; then opening the first high-pressure valve and retract a piston in the pressurizing device to an end, so that a liquid injection chamber of the pressurizing device is filled with the gas-liquid mixture; closing the first high-pressure valve and opening the second high-pressure valve to supplement the gas-liquid mixture into the annular pipeline structure from the liquid injection chamber of the pressurizing device.

S400: S100, S200 and S300 are repeated based on the 3D shape of the inside of the annular pipeline structure obtained in S300 until the gas-liquid mixture flowing in the pipeline forms a hydrate attached to a sidewall of the pipeline, and a corresponding parameter is recorded. The corresponding parameter includes, but is not limited to, a corresponding relationship between a generation rate and volume of the solid hydrate on the inner wall of the pipeline and a time, a cross-sectional area of the pipeline, a pressure, a temperature and a flow rate.

S500: a visual test simulation of the secondary generation process of the hydrate is completed when the hydrate generated in the pipeline blocks the pipeline or a temperature control is completed according to a preset temperature gradient; the temperature of the circulating bath liquid is controlled by the temperature controller in the temperature control device to increase according to the preset temperature gradient, so as to increase the temperature in the annular pipeline structure; a 3D shape of the inside of the annular pipeline structure under different temperatures is obtained based on the detection of the CT imaging device.

S600: a flow rate of a gas-liquid mixture generated by decomposition in the pipeline is controlled by the constant flow pump in the flow control device; the gas-liquid mixture generated by the decomposition of the solid hydrate is collected by the recovery device in the pressure control device.

S700: S500 and S600 are repeated based on the detection of the CT imaging device until the solid hydrate on the inner wall of the pipeline is completely decomposed, and a corresponding parameter is recorded. The corresponding parameter includes, but is not limited to, a corresponding relationship between a decomposing rate and volume of the solid hydrate on the inner wall of the pipeline and a time, a cross-sectional area of the pipeline, a pressure, a temperature and a flow rate.

When there is no solid hydrate in the pipeline, the test ends, but the gas-liquid mixture in the pipeline needs to be recovered by a method as follows: closing the first high-pressure valve and the second high-pressure valve, and opening the third high-pressure valve; making the gas-liquid mixture flow into the recovery device based on a pressure difference between the pipeline and the recovery device; closing the third high-pressure valve when the pressure sensor detects that the pressure in the annular pipeline structure is consistent with that in the recovery device, and opening the fifth high-pressure valve to discharge a residual gas-liquid mixture in the annular pipeline structure to the atmosphere.

The present invention realizes the quantitative detection of the entire secondary generation or decomposition process of the hydrate in the exploitation pipeline. The hydrate conveying pipeline is divided into stationary and rotating sections, and the rotating detection of the entire secondary generation or decomposition process of the hydrate is realized through the rotating section, which greatly improves the visual detection effect and realizes more accurate detection. A temperature-controlled bath liquid pipe is provided outside the hydrate conveying device, and the temperature of the bath liquid in the temperature-controlled bath liquid pipe is controlled so as to control the temperature of the hydrate in the annular pipeline structure. A thermal insulation layer is further provided on an outer side of the temperature-controlled bath liquid pipe so as to ensure that the temperature of the hydrate in the annular pipeline structure is constant and reaches a preset temperature. The booster is provided outside to control the pressure of the liquid hydrate, the constant flow pump controls the flow rate of the hydrate in the pipeline, and the temperature controller controls the temperature of the bath liquid, so as to ensure the stability of corresponding parameters. The liquid hydrate stored in the storage tank is used for pressure control and supplementation of the gas-liquid mixture in the test.

Further, the coaxial rotating motor has a ring structure, and is mounted outside a rotating end of the rotating seal slip ring to drive the corresponding straight pipeline section to rotate.

Further, the ray source emits a high-energy ray, which sequentially penetrates the thermal insulation layer, the temperature-controlled bath liquid pipe, the straight pipeline section, the solid hydrate attached to the inner side of the pipeline and the flowing liquid hydrate. The detector receives the high-energy ray after attenuation. The imaging system extracts an accurate 3D CT digital image of the solid hydrate based on a signal from the detector. In the generation process of the solid hydrate, CT scanning is continuously performed to quantitatively acquire the entire secondary generation process of the solid hydrate in the exploitation pipeline.

The present invention acquires the secondary generation or decomposition rate of the hydrate under corresponding parameters, and realizes real-time and accurate 3D detections, which provides reliable data for controlling the secondary generation of the hydrate and the decomposition of the secondary hydrate in actual exploitation.

Further, the visual test system is provided with a central processing unit. The CT imaging device, the temperature control device, the pressure control device, the flow control device and the driving device of the straight pipeline section are signal-connected to the central processing unit. Based on a real-time detection of the movement of the gas-liquid mixture in the annular pipeline structure and the secondary generation of the hydrate, the central processing unit controls the temperature control device, the pressure control device and the flow control device to correspondingly adjust the temperature, pressure and flow rate. The central processing unit records the corresponding parameters in real time, and derives the secondary generation or decomposition of the hydrate, so as to acquire a corresponding simulation parameter value.

Although the present invention is described with reference to the preferred embodiments, various modifications may be made to the present invention and the components therein may be replaced with equivalents without departing from the scope of the present invention. In particular, the various technical features mentioned in the various embodiments may be combined in any manner in case of no structural conflict. The present invention is not limited to the specific embodiments disclosed herein, but includes all technical solutions falling within the scope of the claims.

It should be noted that in the description of the present invention, terms such as "central", "upper", "lower", "left", "right", "vertical", "horizontal", "inner" and "outer" indicate orientation or position relationships based on the accompanying drawings. They are merely intended to facilitate description, rather than to indicate or imply that the mentioned device or components must have the specific orientation and must be constructed and operated in the specific orientation. Therefore, these terms should not be construed as a limitation to the present invention. Moreover, the terms "first", "second" and "third" are used only for the purpose of description, rather than to indicate or imply relative importance.

It should be noted that in the description of the present invention, unless otherwise clearly specified, meanings of terms "install/mount", "connect with" and "connect to" should be understood in a broad sense. For example, the connection may be a fixed connection, a removable connection, or an integral connection; may be a mechanical connection or an electrical connection; may be a direct connection or an indirect connection via a medium; or may be an internal connection between two components. Those skilled in the art should understand the specific meanings of the above terms in the present invention based on specific situations.

In addition, terms "include", "comprise", or any other variations thereof are intended to cover non-exclusive inclusions, so that a process, an article, or a device/apparatus including a series of elements not only includes those elements, but also includes other elements that are not explicitly listed, or also includes inherent elements of the process, the article or the device/apparatus.

The technical solutions of the present invention are described with reference to the preferred implementations and accompanying drawings. Those skilled in the art should easily understand that the protection scope of the present invention is apparently not limited to these specific implementations. Those skilled in the art can make equivalent changes or substitutions to the relevant technical features without departing from the principles of the present invention, and the technical solutions after these changes or substitutions should fall within the protection scope of the present invention.

What is claimed is:

1. A visual test system for a secondary generation or a decomposition process of a hydrate, comprising: a hydrate conveying device, a computerized tomography (CT) imaging device, a temperature control device, a pressure control device and a flow control device; wherein the hydrate conveying device comprises a plurality of straight pipeline sections and a plurality of curved pipeline sections; the plurality of curved pipeline sections and the plurality of straight pipeline sections are connected in sequence to form an annular pipeline structure; each straight pipeline section of the plurality of straight pipeline sections is configured to rotate around an axis of the each straight pipeline section under a drive of a corresponding pipeline driving device;

the CT imaging device comprises at least one turntable, a ray source and at least one detector; the at least one turntable is provided inside the annular pipeline structure; the ray source is provided on the at least one turntable and the ray source is configured to rotate under a drive of a turntable driving device; the at least one detector is provided outside the annular pipeline structure, and the at least one detector is used to cooperate with the ray source to perform a three-dimensional (3D) detection inside a corresponding straight pipeline section;

the temperature control device is used to control a temperature of a gas-liquid mixture in the hydrate conveying device;

the pressure control device is used to control a pressure of the gas-liquid mixture in the hydrate conveying device;

the flow control device comprises a flow sensor and a constant flow pump; the flow sensor and the constant flow pump are respectively provided in the annular pipeline structure, and the flow sensor and the constant flow pump are used to control a flow rate of the gas-liquid mixture in the hydrate conveying device.

2. The visual test system according to claim 1, wherein the at least one detector comprises a plurality of detectors;
the plurality of detectors are respectively provided outside the plurality of straight pipeline sections.

3. The visual test system according to claim 2, wherein the at least one turntable is provided in a center of the annular pipeline structure.

4. The visual test system according to claim 2, wherein the at least one turntable comprises a plurality of turntables;
the plurality of turntables are provided corresponding to the plurality of straight pipeline sections.

5. The visual test system according to claim 4, wherein an included angle between lines formed by connecting two ends of each detector of the plurality of detectors to the ray source is greater than an included angle between lines formed by connecting two ends of the each straight pipeline section corresponding to the each detector to the ray source; a length of the each detector is greater than a length of the each straight pipeline section corresponding to the each detector.

6. The visual test system according to claim 1, wherein an annular sealing device is provided between a predetermined straight pipeline section of the plurality of straight pipeline sections and a predetermined curved pipeline section of the plurality of curved pipeline sections, and the predetermined straight pipeline section and the predetermined curved pipeline section are adjacent to each other; the annular sealing device comprises a slip ring rotating part, a slip ring stationary part and a rotating seal slip ring; the slip ring rotating part is provided at an end of the predetermined straight pipeline section; the slip ring stationary part is provided at an end of the predetermined curved pipeline section; the rotating seal slip ring is provided between the slip ring rotating part and the slip ring stationary part, and the rotating seal slip ring is configured to rotate around an axis of the rotating seal slip ring under the drive of the corresponding pipeline driving device to realize a rotation of the corresponding straight pipeline section;

the pipeline driving device is a coaxial rotating motor; the coaxial rotating motor is provided outside the corresponding straight pipeline section.

7. The visual test system according to claim 1, wherein the temperature control device comprises a temperature-controlled bath liquid pipe, a thermal insulation layer, a temperature sensor and a temperature controller; the temperature-controlled bath liquid pipe comprises a first temperature-controlled bath liquid pipe and a second temperature-controlled bath liquid pipe; the first temperature-controlled bath liquid pipe is provided on a peripheral side of the hydrate conveying device; the second temperature-controlled bath liquid pipe is provided between the first temperature-controlled bath liquid pipe and the temperature controller, and a connecting section of the second temperature-controlled bath liquid pipe and the first temperature-controlled bath liquid pipe is provided in one curved pipeline section of the plurality of curved pipeline sections; the temperature controller controls a temperature of a bath liquid in the hydrate conveying device through the first temperature-controlled bath liquid pipe and the second temperature-controlled bath liquid pipe.

8. The visual test system according to claim 1, wherein each of the at least one turntable comprises a rotating part and a supporting part; the rotating part and the supporting part are relatively rotatably connected;
- at least one groove is provided on an upper side of the rotating part;
- at least one protrusion is provided on a bottom of the ray source;
- the ray source is fixedly provided on the rotating part through the protrusion and the groove on the rotating part.

9. The visual test system according to claim 1, wherein the pressure control device comprises a pressurizing device, a storage device, a recovery device and a pressure sensor; the storage device is connected to the pressurizing device through a first pipe; the pressurizing device is connected to the annular pipeline structure through a second pipe; the recovery device is connected to the annular pipeline structure through a third pipe; the pressure sensor is provided in the third pipe to detect a difference between internal pressures of the annular pipeline structure and the recovery device;
- the first pipe, the second pipe and the third pipe are respectively provided with a high-pressure valve.

10. A visual test method for a secondary generation or a decomposition process of a hydrate, based on the visual test system according to claim 1, comprising the following steps:
- S100: controlling, by the temperature control device, a bath liquid in a temperature-controlled bath liquid pipe outside the annular pipeline structure to a preset first temperature;
- S200: controlling, by the pressure control device, a storage device to inject the gas-liquid mixture into the annular pipeline structure until the annular pipeline structure is full; controlling, by the pressure control device, a pressurizing device to control a pressure in the annular pipeline structure, and controlling the pressure of the gas-liquid mixture in the annular pipeline structure to reach a preset pressure value according to a detection of a pressure sensor; obtaining an initial 3D shape of an inside of the annular pipeline structure based on a detection of the CT imaging device;
- S300: controlling, by the flow control device, the gas-liquid mixture in a pipeline to circulate to obtain a circulating gas-liquid mixture;
- controlling, by the temperature control device, a temperature of the circulating gas-liquid mixture to reduce according to a preset temperature gradient so as to reduce a temperature in the annular pipeline structure; obtaining a first 3D shape of the inside of the annular pipeline structure under different temperatures based on the detection of the CT imaging device, so as to acquire a dynamic generation process of a solid hydrate in the pipeline;
- wherein the detection of the CT imaging device is a comprehensive 3D detection performed on the corresponding straight pipeline section through a rotation control of the corresponding straight pipeline section by the pipeline driving device and cooperation of the turntable with the detector;
- S400: repeating S100, S200 and S300 based on the first 3D shape of the inside of the annular pipeline structure obtained in S300 until the circulating gas-liquid mixture flowing in the pipeline forms the hydrate attached to a sidewall of the pipeline, and recording a first corresponding parameter;
- S500: when the hydrate generated in the pipeline blocks the pipeline or a temperature control is completed according to the preset temperature gradient, controlling, by the temperature control device, the temperature of the circulating gas-liquid mixture to increase according to the preset temperature gradient so as to increase the temperature in the annular pipeline structure; obtaining a second 3D shape of the inside of the annular pipeline structure under different temperatures based on the detection of the CT imaging device;
- S600: controlling, by the flow control device, the flow rate of the gas-liquid mixture generated by the decomposition process in the pipeline;
- collecting, by a recovery device in the pressure control device, the gas-liquid mixture generated by the decomposition process of the solid hydrate; and
- S700: repeating S500 and S600 based on the detection of the CT imaging device until the solid hydrate on an inner wall of the pipeline is completely decomposed, and recording a second corresponding parameter.

11. The visual test method according to claim 10, wherein the at least one detector comprises a plurality of detectors; the plurality of detectors are respectively provided outside the plurality of straight pipeline sections.

12. The visual test method according to claim 11, wherein the at least one turntable is provided in a center of the annular pipeline structure.

13. The visual test method according to claim 11, wherein the at least one turntable comprises a plurality of turntables; the plurality of turntables are provided corresponding to the plurality of straight pipeline sections.

14. The visual test method according to claim 13, wherein an included angle between lines formed by connecting two ends of each detector of the plurality of detectors to the ray source is greater than an included angle between lines formed by connecting two ends of the each straight pipeline section corresponding to the each detector to the ray source; a length of the each detector is greater than a length of the each straight pipeline section corresponding to the each detector.

15. The visual test method according to claim 10, wherein an annular sealing device is provided between a predetermined straight pipeline section of the plurality of straight pipeline sections and a predetermined curved pipeline section of the plurality of curved pipeline sections, and the predetermined straight pipeline section and the predetermined curved pipeline section are adjacent to each other; the annular sealing device comprises a slip ring rotating part, a slip ring stationary part and a rotating seal slip ring; the slip ring rotating part is provided at an end of the predetermined straight pipeline section; the slip ring stationary part is provided at an end of the predetermined curved pipeline section; the rotating seal slip ring is provided between the slip ring rotating part and the slip ring stationary part, and the rotating seal slip ring is configured to rotate around an axis of the rotating seal slip ring under the drive of the corresponding pipeline driving device to realize a rotation of the corresponding straight pipeline section;
- the pipeline driving device is a coaxial rotating motor; the coaxial rotating motor is provided outside the corresponding straight pipeline section.

16. The visual test method according to claim 10, wherein the temperature control device comprises the temperature-controlled bath liquid pipe, a thermal insulation layer, a temperature sensor and a temperature controller; the temperature-controlled bath liquid pipe comprises a first temperature-controlled bath liquid pipe and a second temperature-controlled bath liquid pipe; the first temperature-controlled bath liquid pipe is provided on a peripheral side of the hydrate conveying device; the second temperature-controlled bath liquid pipe is provided between the first temperature-controlled bath liquid pipe and the temperature controller, and a connecting section of the second temperature-controlled bath liquid pipe and the first temperature-controlled bath liquid pipe is provided in one curved pipeline section of the plurality of curved pipeline sections; the temperature controller controls a temperature of a bath liquid in the hydrate conveying device through the first temperature-controlled bath liquid pipe and the second temperature-controlled bath liquid pipe.

17. The visual test method according to claim 10, wherein each of the at least one turntable comprises a rotating part and a supporting part; the rotating part and the supporting part are relatively rotatably connected;

at least one groove is provided on an upper side of the rotating part;

at least one protrusion is provided on a bottom of the ray source;

the ray source is fixedly provided on the rotating part through the protrusion and the groove on the rotating part.

18. The visual test method according to claim 10, wherein the pressure control device comprises the pressurizing device, the storage device, the recovery device and the pressure sensor; the storage device is connected to the pressurizing device through a first pipe; the pressurizing device is connected to the annular pipeline structure through a second pipe; the recovery device is connected to the annular pipeline structure through a third pipe; the pressure sensor is provided in the third pipe to detect a difference between internal pressures of the annular pipeline structure and the recovery device;

the first pipe, the second pipe and the third pipe are respectively provided with a high-pressure valve.

* * * * *